(12) United States Patent
Swietlicka et al.

(10) Patent No.: US 9,367,589 B1
(45) Date of Patent: Jun. 14, 2016

(54) WHERE TO GO NEXT VIA MINED TRAILS

(71) Applicant: GOOGLE INC., Mountain View, CA (US)

(72) Inventors: Joanna Franciszka Swietlicka, London (GB); Matthew Nicholas Stuttle, Haywards Heath (GB); Sebastian Dörner, London (GB); Alexandra Gherghina, London (GB); Hassan Mansoor, London (GB); Christian Brunschen, London (GB); Richard Michael Farrell, Whitstable (GB); Evelyn Kim, New York, NY (US); Samreen Dhillon, Jersey City, NJ (US); Federico Asara, London (GB); Tyrone Nicholas, Croydon (GB)

(73) Assignee: Google Inc., Mountain View, CA (US)

( * ) Notice: Subject to any disclaimer, the term of this patent is extended or adjusted under 35 U.S.C. 154(b) by 223 days.

(21) Appl. No.: 14/080,772

(22) Filed: Nov. 14, 2013

(51) Int. Cl.
*G06F 17/30* (2006.01)

(52) U.S. Cl.
CPC .................. *G06F 17/30539* (2013.01)

(58) Field of Classification Search
CPC ............ G06F 17/30867; G06F 17/30761; G06F 17/30241; G06F 17/302411
See application file for complete search history.

(56) References Cited

U.S. PATENT DOCUMENTS

| 8,073,460 | B1* | 12/2011 | Scofield | G06Q 30/02 455/414.1 |
| 2010/0076968 | A1* | 3/2010 | Boyns | G06F 17/30241 707/732 |
| 2010/0291950 | A1* | 11/2010 | Lin | H04W 4/02 455/456.3 |
| 2012/0047147 | A1* | 2/2012 | Redstone | G06F 17/3087 707/748 |
| 2013/0097246 | A1* | 4/2013 | Zifroni | G06Q 50/01 709/204 |
| 2013/0238241 | A1* | 9/2013 | Chelotti | G01C 21/3617 701/533 |
| 2014/0074873 | A1* | 3/2014 | Ngo | G06F 17/30241 707/758 |
| 2015/0106366 | A1* | 4/2015 | Stuttle | G06F 17/3053 707/732 |

* cited by examiner

*Primary Examiner* — Yuk Ting Choi
(74) *Attorney, Agent, or Firm* — Foley & Lardner, LLP; John D. Lanza

(57) ABSTRACT

A system and method for providing destination recommendations to a user based on mining of a location history. The location history provides information on locations visited by users of the system over time. The system mines the location history to identify location pairs. Each location pair comprises an originating location visited by a user and a next location that was visited by the user within a defined time threshold of visiting the originating location. The system aggregates location pairs by common originating location. The system then takes into account the current location of a requesting user. The system uses the current location information to identify a corresponding originating location in a location history index. The system provides recommendations based at least in part on how frequently certain next locations were visited after visiting the originating location.

19 Claims, 4 Drawing Sheets

WHERE TO GO NEXT VIA MINED TRAILS

TECHNICAL FIELD

This disclosure relates to systems and methods for providing one or more destination recommendations to a user based on mining a location history. More particularly, the present disclosure provides systems and methods for identifying locations that are visited after users visit an originating location and providing destination recommendations based at least in part on the frequency those locations are visited after visiting the originating location.

BACKGROUND

Local search suggestions provide users personalized recommendations on locations, such as restaurants and museums, they may like to visit. The recommendation is typically based on user specified personal preferences. The process typically requires a user, in addition to defining their personal preferences, to request a search and then successively refine the search until an appropriate place is suggested and the user can take action. Users desire to obtain personalized recommendations that take into account the context of the user's current location and require minimal input from the user.

SUMMARY

In certain example embodiments described herein, a method for providing destination recommendations comprises receiving current location information from a remote computing device associated with a user, identifying an originating location in a location history index corresponding to the current location, generating a destination recommendation list comprising one or more next destinations ranked at least in part on a visit frequency, determining a confidence value for each destination on the destination recommendation list, determining if the confidence value for each destination exceeds a confidence threshold value, and communicating the destination recommendation list to the remote computing device.

In certain other example embodiments described herein, a system and a computer program product for providing destination recommendations are provided.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Figure 1:
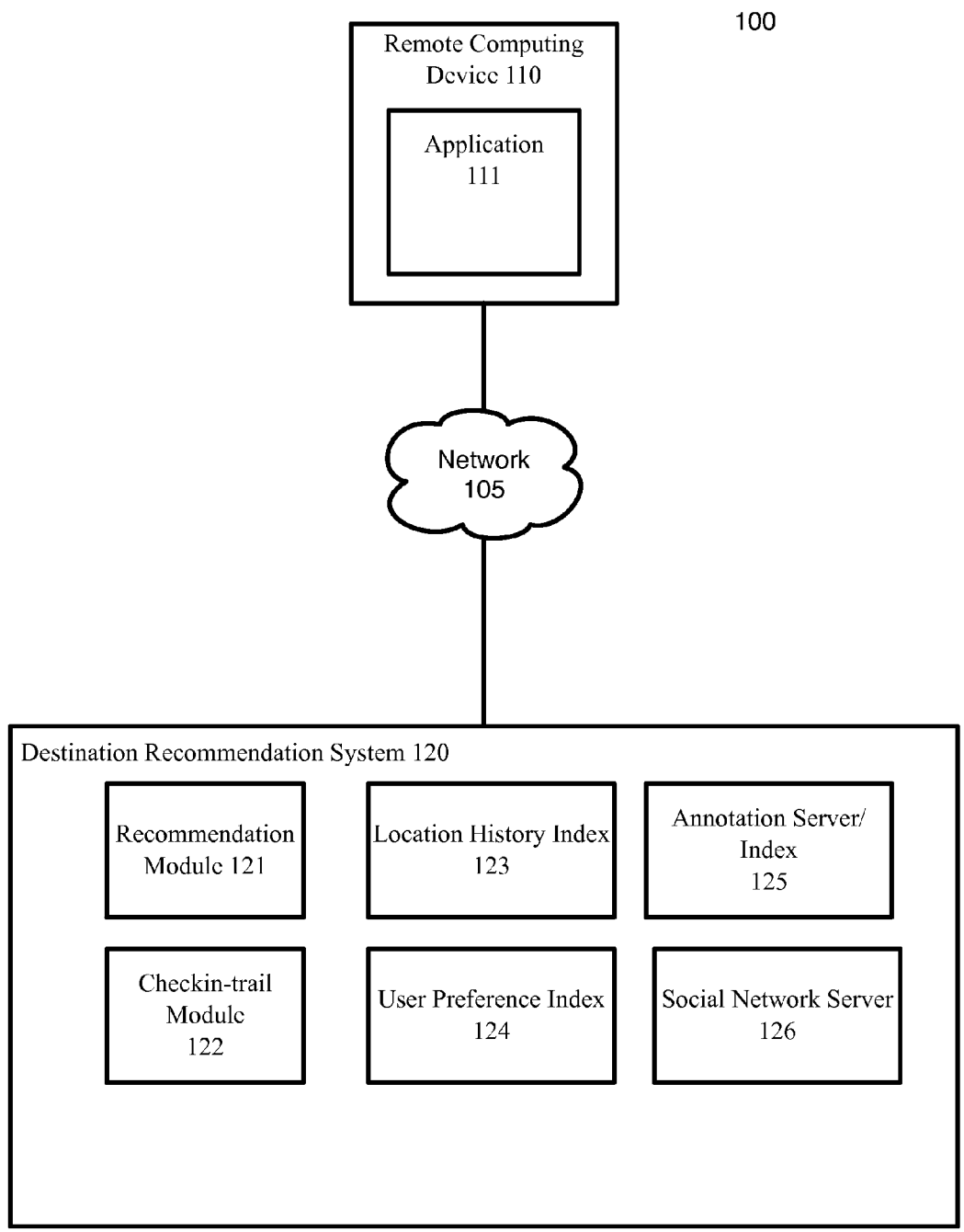
FIG. 1 is a block diagram depicting a system for providing destination recommendations by mining a location history, in accordance with certain example embodiments.

The embodiments described herein provide systems, methods, and computer program products for providing destination recommendations to a user based on mining of a location history. The location history provides information on locations visited by users of the system over time. The system mines the location history to identify location pairs. Each location pair comprises an originating location visited by a user and a next location that was visited by the user within a defined time threshold of visiting the originating location. The system aggregates location pairs by common originating location. The system then takes into account the current location of a requesting user. The system uses the current location information to identify a corresponding originating location in a location history index. The system provides recommendations based at least in part on how frequently certain next locations were visited after visiting the originating location.

The process for providing a destination recommendation is initiated when the system receives a location-based signal from a remote computing device associated with a user. The location-based signal provides a current location of the remote computing device. The user may explicitly initiate a destination recommendation request. Alternatively, the user may elect to allow the remote computing device to provide updated location information to the system and allow the system to surface destination recommendations automatically. In certain example embodiments, the destination recommendation request is initiated using a single-tap signal. For example, the user may initiate the request by making a defined gesture on the remote computing device user interface, issue a voice command, or make a defined gesture with the remote computing device. Alternatively, the user may enable a location history feature that provides time-stamped GPS coordinates to the system at defined intervals. Location-based signals may only be acquired by the system if the user has given prior permission to share such location-based signals from the user's remote computing device.

The system then compares the current location of the requesting user with an indexed location history. The location history comprises location-based signals previously received from the remote computing devices of registered users. These location-based signals include, for example, check-ins, posts to social networks, and implicit location signals from a recorded location history of the user, or a combination thereof. These signals may be referred to collectively as "checkins" The location-based signals are not stored in the location history index in association with a particular registered user. Instead the location-based signals are used to identify location pairs in the location history information. Location-pairs comprise an originating location and a next location. The first location may also be designated the "from place" and the next location the "to place." The system identifies location pairs by identifying those next locations with a location-based signal that were received within a given time threshold after receiving a location-based signal from the first location. For example, the time threshold may be 4 hours and any location-based signals received from a location within four hours of receiving a location-based signal from an "from place" would be considered a "to place." All "to place" locations are aggregated in the index to a common "from location." From each "from place," this yields a list of potential "to places," each with a frequency of how often a given "to place" followed the "from place." The list may then be reduced by applying a frequency threshold so that only the most frequently visited "to places" remain.

The system then communicates to the remote computing device a list of destination recommendations that represent those locations that are most frequently visited after leaving the requesting user's current location. In certain example embodiments, if the number of "to places" is limited, the destination recommendation may generalize by categories, for example, "pubs" instead of an exact location. This allows the system to provide recommendations even when the number of "to places" from a given "from place" is limited. The destination recommendation may be further refined by re-ranking or annotating the most frequently visited next locations based on the requesting user's personal preference profile. For example, if a user's personal preference profile indicates that the user prefers Italian restaurants rather than Greek restaurants, Italian restaurants may be ranked higher in the destination recommendation even through a higher frequency is associated with a Greek restaurant. Annotations may include reviews and ratings, including reviews or ratings from members of the users social graph, as well as local offers related to the recommended destination.

The system then communicates the destination recommendation to the remote computing device of the user. The system may also index the user's response to the destination recommendation. If the system detects that the user actually visited the recommended destination, this information may be used to positively weight future destination recommendations of a similar type. For example, a recommendation that is in a similar location, price range, or type of location, may be weighted higher in the recommendation results based on the requesting user demonstrating a preference by previously accepting or acting upon these types of recommendations.

Turning now to the drawings, in which like numerals represent like (but not necessarily identical) elements throughout the figures, example embodiments are described in detail.

Example System Architectures

FIG. 1 is a block diagram depicting a system providing destination recommendations based on mining of a location history, in accordance with certain example embodiments. As depicted in FIG. 1, the operating environment 100 includes network computing devices 110 and 120 that are configured to communicate with one another via one or more networks 105. In some embodiments, a user associated with the remote computing device 110 must install an application and/or make a feature selection to obtain the benefits of the techniques described herein.

Each network computing device 110 and 120 includes a computing device having a communication module capable of transmitting and receiving data over the network 105. For example, each network device 110 and 120 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the remote computing devices 110 and 120 are operated by end-users or consumers (not depicted) and destination recommendation system operators (not depicted), respectively.

A user can use application 111, such as a web browser application or a stand-alone application, to view, download, upload, or otherwise access documents or web pages via the distributed network 105. The network 105 includes a wired or wireless telecommunication system or device by which network devices (including devices 110 and 120) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer based environment.

The destination recommendation system 120 may comprise a recommendation module 121 a check-in trail module 122, a location history index 123, a user preference index 124, an annotation server/index 125, and a social network server 126. The user preference index 124, annotation server/index 125, and social network server 126 but may be operated by a separate and distinct service provider, or may be an integral part of the destination recommendation system 120. The recommendation module 121 detects location based signals from registered remote computing devices 110. The check-in trail module 122 identifies pairs of location-based signals previously stored in the location history index 123 by the recommendation module 121. The check-in trail module 122 further aggregates location pairs in the location history index 123 by a common originating location. The recommendation module 121 detects a location based signal from a user's remote computing device 110. The location based signal may not be detected by the recommendation module 121 without the user's prior consent. The recommendation module 121 uses the current location of the remote computing device to identify a corresponding originating location in the location history index 123. The recommendation module 121 then provides one or more recommendations based at least in part on how frequently a given location was visited after the originating location. The user preference index 124 stores user preference profiles that may be used to further modify the destination recommendations. The annotation server/index 125 stores annotation content associated with a location such as user reviews and offers that may be used to annotate the destination recommendations. The social network server 126 provides information on a user's social network and may be used to determine if content in the annotation server/index 125 was provided by a member of the user's social graph.

It will be appreciated that the network connections shown are examples and other mechanisms of establishing a communications link between the computers and devices can be used. Additionally, those having ordinary skill in the art and having the benefit of the present disclosure will appreciate that the destination recommendation system 120 and remote computing device 110 illustrated in FIG. 1 can have any of several other suitable computer system configurations. For example a remote computing device 110 embodied as a mobile phone or handheld computer may not include all the components described above.

Example Processes

Figure 2:
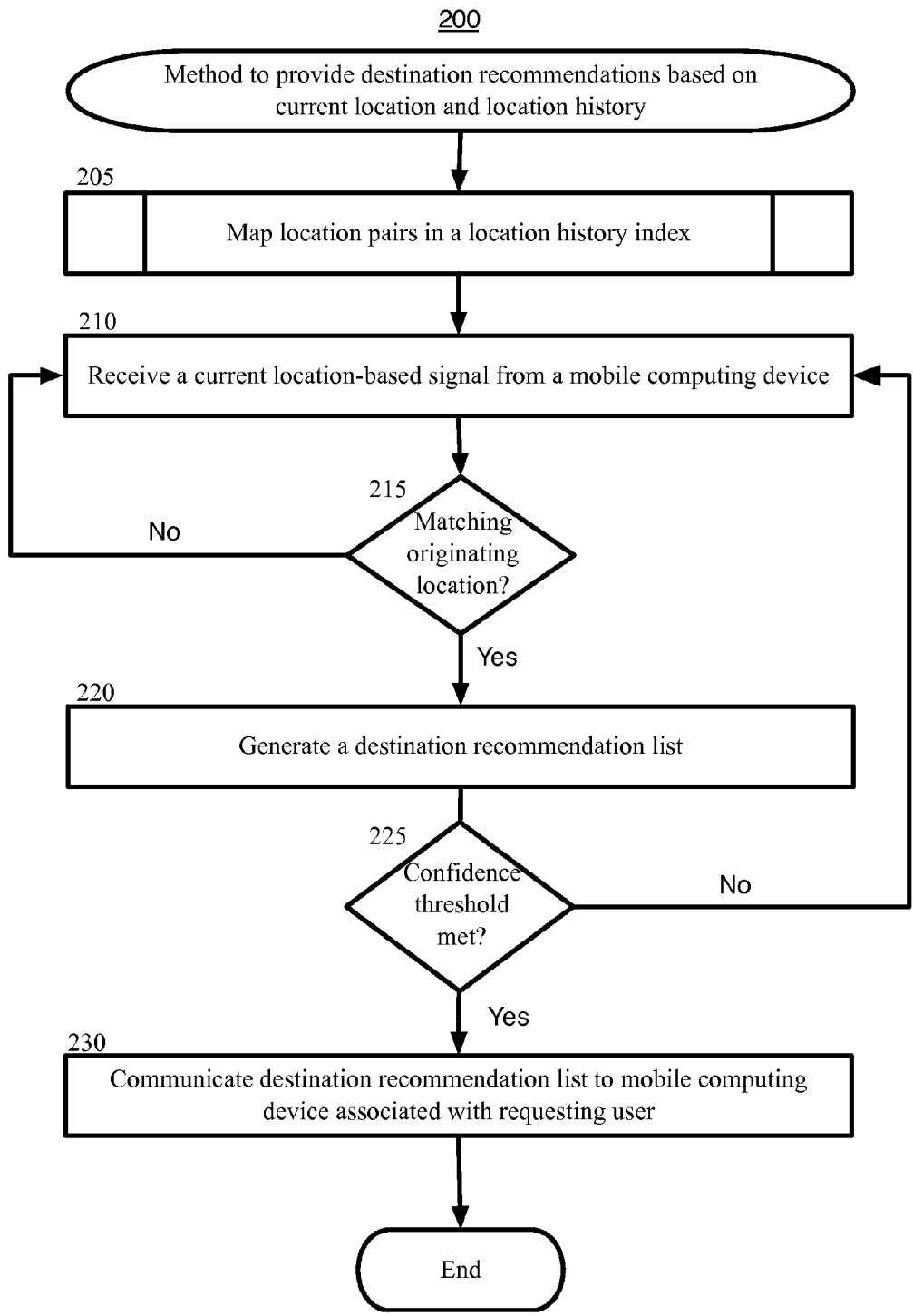
FIG. 2 is a block flow diagram depicting a method to provide destination recommendations based on current location and a location history, in accordance with certain example embodiments.
Figure 3:
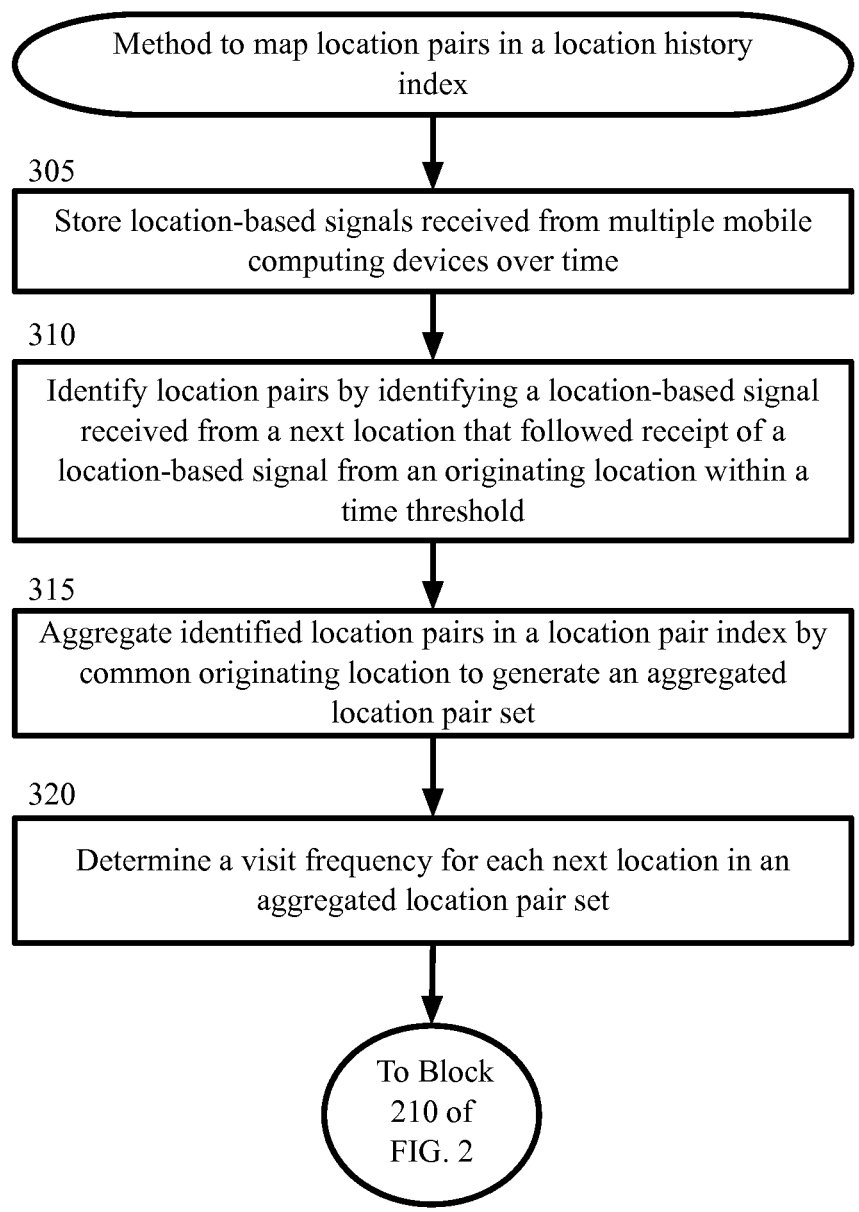
FIG. 3 is a block flow diagram depicting a method to identify locations pairs in a location history index, in accordance with certain example embodiments.

The example methods illustrated in FIGS. 2-3 are described hereinafter with respect to the components of the example operating environment 100. The example methods of FIGS. 2-3 may also be performed with other systems and in other environments.

FIG. 2 is a block flow diagram depicting a method 200 to provide destination recommendations based on current location and a location history, in accordance with certain example embodiments.

Method 200 begins at block 205, where the check-in trail module 122 maps locations pairs in a location history index 123. Block 205 will be described in further detail with reference to FIG. 3 below.

FIG. 3 is a block diagram depicting a method 205 to map locations pairs in a location history index, in accordance with certain example embodiments. Method 205 begins at block 305, where the recommendation module 121 stores location-based signals received from registered remote computing devices 110 in a location history index 123. For example, via the remote computing device 110, a user may check-in to a location on an application, such as application 111, the user may post to a social network wherein the post comprises metadata identifying the location and time at which the post was made, or the user may enable a location history feature on the remote computing device 110 or application 111. The location history features provides time-stamped GPS coordinates at defined intervals that can be mapped to likely locations visited by the user. The interval may be collected at set time intervals or when the remote computing device 110 is at certain locations. For example, time-stamped GPS coordinates may only be sent went the remote computing device in a public place. In general, a location-based signal is any signal that identifies a place and a time associated with a computing device 110. In certain example embodiments, information stored in the location history index 123 may refer to the user anonymously. As used throughout the remainder of this application, the term location-based signal will be referred to for simplicity as a check-in signal.

At block 310, the check-in trail module 122 identifies location pairs in the location history index 123, the location history index 123 comprising location pair information from multiple registered users of the system. For example, the check-in trail module 122 identifies pairs of check-ins by a same user that occurred within a given time threshold. In certain example embodiments, multiple time thresholds may be applied depending on the type of location. For example, the time threshold may be longer if a user first checks-in at a sporting event that will last several hours than if the user first checks-in at a restaurant. The first location in an identified location pair may be considered the originating location or the "from place." The second location in the identified location pair may be considered the next location or the "to place."

At block 315, the check-in trail module 122 aggregates the identified location pairs by common originating location to generate an aggregated location. For example, a first location pair with an originating location of X and a next location of Y1, and a second location pair with an originating location of X and a next location of Y2, would be aggregated together based on the common originating location X. For each originating location, this yields a list of potential next locations (for example, Y1, Y2) corresponding to each originating location (for example, X).

In block 320, the check-in trail module 122 determines a visit frequency for each next location in an aggregated location pair. Using the above example, if there were five X and Y1 location pairs and three X and Y2 location pairs, the check-in trail module 122 may note that Y1 has a visit frequency of 5 and Y2 has a visit frequency of 3. In certain example embodiments, the check-in trail module 122 reduces the list of potential next locations by a applying a frequency threshold where only those next locations with a visit frequency above the frequency threshold remain on the list. The method then proceeds to block 210 of FIG. 2.

Returning to block 210 of FIG. 2, where the recommendation module 121 detects a current check-in from a remote computing device 110 associated with a requesting user. A current check-in, as distinguished from a previously received check-in, is used to determine whether a destination recommendation should be generated for the requesting user. However, the recommendation module 121 also records the check-in information in the location history index 123, and this information is used by the check-in trail module 122 to update the location pair information as discussed above regarding blocks 305 to 320. In certain example embodiments, the recommendation module 121 detects the check-in because the user communicates a recommendation request from a remote computing device 110. For example, the user may install an application 111 or an application program interface (API) on the remote computing device 110 that provides the user with a user interface object that can be used to send a recommendation request. In one example embodiment, the destination recommendation feature is an integrated part of the remote computing device 110 operating system. In certain example embodiments, the user interface may comprise a single-tap recommendation request. For example, the user may touch a defined area of the remote computing device 110 user interface, issue a voice command, or make a defined gesture with the remote computing device 110. In other example embodiments, the recommendation module 121 may receive time-stamped GPS coordinates at regular because the user has turned on and authorized the location history feature discussed above in reference to block 305.

At block 215, the recommendation module 121 uses the location information in the current check-in to determine if a corresponding originating location is in the location pair index 123. In certain example embodiments where the user has enabled a location history feature, the recommendation module 121 may check for an corresponding originating location each time a time-stamped location signal is received from the remote computing device 110. If the recommendation module 121 does not identify a corresponding originating location in the location pair index 123, the method returns to block 210. If the recommendation module does detect a corresponding originating location in the location pair index 123, the method proceeds to block 220.

At block 220, the recommendation module 121 generates a recommendation list comprising one or more of the next locations associated with originating location. In one example embodiment, the recommendation module 121 selects the next location with the top visit frequency or otherwise orders a list of next locations based on visit frequencies for each next location. In another example embodiment, the recommendation module 121 may select all or a portion of the next locations that are above the frequency threshold. In certain example embodiments, the recommendation module 121 may re-rank the initial destination recommendation list. For example, the recommendation module 121 may access a user preference profile index 124. For each registered user of the system 120, the user preference profile index 123 stores a preference profile. The preference profile may be created by the user when the user registers with the group recommendation system 120. In certain example embodiments, a user's personal preferences may be inferred from behavior of the user on the system or related applications. For example, a personal preference for a particular restaurant may be inferred from repeated check-ins at the same location, the writing of a review after visiting a given location, or bookmarking of locations. The recommendation module 121 may compare the ranked results based on frequency to how the results would be ranked or scored based on the user personal preference profile. For example, if a user's personal preference profile indicates the user prefers Italian restaurants rather than Greek restaurants, Italian restaurants may be ranked higher in the destination recommendation even through a higher visit frequency is associated with a Greek restaurant.

In certain example embodiments, the recommendation module 121 may also annotate the final destination recommendations. For example, the recommendation module 121 may access an annotation server/index 125 for annotations related to the destination recommendations. For example, the annotation server 125 may contain product reviews or user reviews, and the recommendation module 121 may request reviews related to the destination recommendations from the annotation server 125 and include the reviews or a link to the reviews with the destination recommendation. In one example embodiment, the recommendation module 121 may limit the search to reviews or ratings provided by members of the user's social graph. The recommendation module 121 may communicate a request to remote computing device 110 to access the social graph information of the requesting user, for example by requesting the user login in to their social network account, wherein the login authorizes a social network server 126 to share social graph information with the recommendation module 121. The recommendation module 121 may also annotate the destination recommendations with direction information, such as distance, walking and/or transit directions, and transit options.

At block 225, the recommendation module 121 may also check to see if a confidence threshold has been met. To determine if a confidence threshold has been met the recommendation module 121 may determine how well the recommendation compares to the user's personal preference profile as described in block 220 above. For example, the recommendation module 121 may determine how well the recommendation compares to the user's personal preference profile by determining if the recommendation matches a preference, such as restaurant category, in the personal preference profile. For each preference the recommendation meets, the recommendation module 121 may increase a confidence score for the recommendation. The recommendation module 121 may also look at the level of annotation on the recommendation. For example, recommendation module 121 may also determine if any of the available annotation content includes annotations by members of the user's social graph. If annotation content is available from members of the requesting user's social graph, the recommendation module 121 may increase the confidence score based on the number of annotations originating from members of the user's social graph, by how close on the graph a member who generated an annotation is to the user, or a combination thereof. If the confidence score is above the defined confidence threshold the process continues to block 225. If the confidence score is below the confidence threshold, the process returns to block 210. In certain example embodiments, the process proceeds directly from block 220 to block 230 without computing a confidence score.

At block 230, the recommendation module 121 communicates the destination recommendation to the remote computing device 110. The destination recommendation may display the destination recommendations in the application 111. In one example embodiment, the destination recommendation may be displayed in a general mobile interface that is not application-specific. For example, the destination recommendation may be provided as a push notification or as a banner across the top of the general remote computing device interface regardless of whether the user specifically requested the destination recommendation.

Other Example Embodiments

Figure 4:
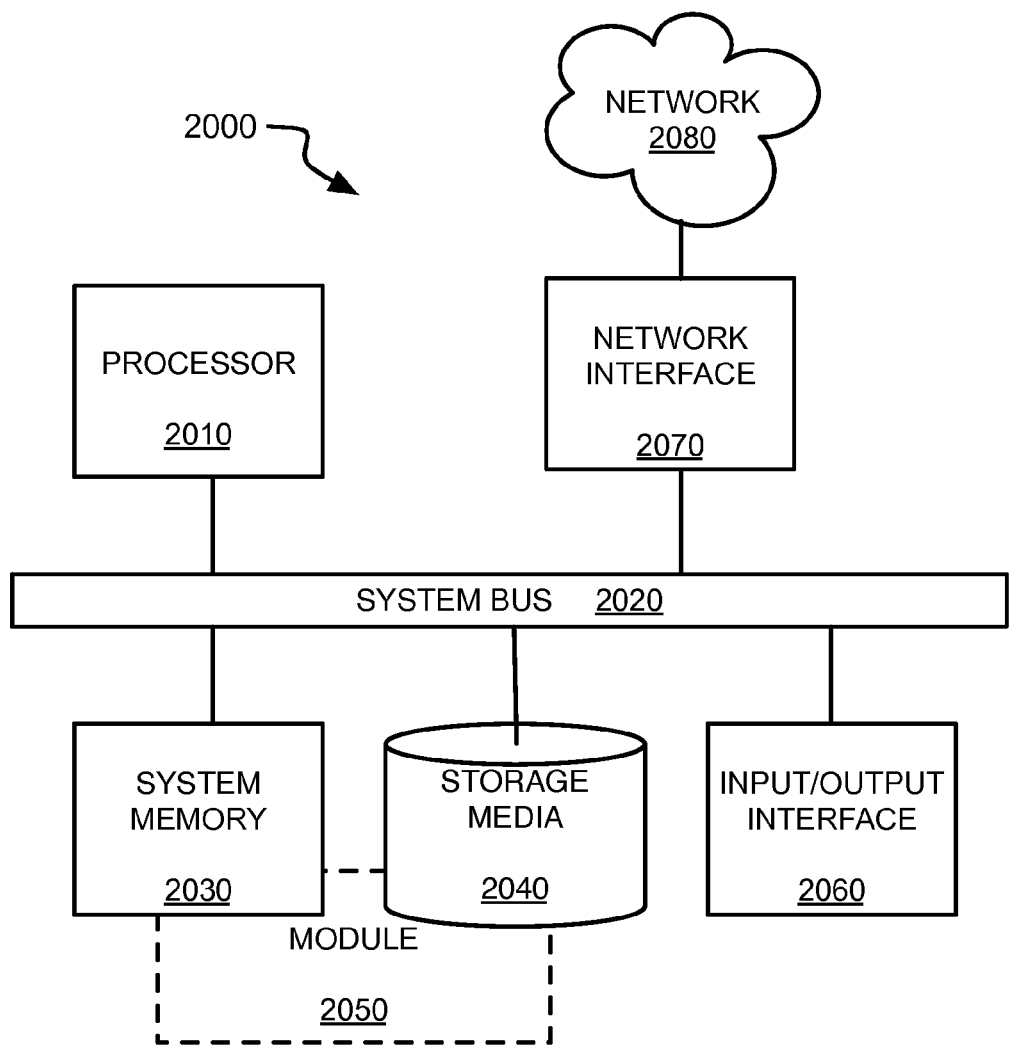
FIG. 4 is a block diagram depicting a computing machine and a module, in accordance with certain example embodiments.

FIG. 4 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions.

Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method running on one or more computing devices comprising:
   receiving one or more next locations from one or more other remote computing devices for an origination location;
   receiving a location-based signal from a remote computing device associated with a user, the location-based signal indicating a current location of the remote computing device and comprising one of a check-in signal, a post to a social network account associated with the user, and a time-stamped set of GPS coordinates;
   identifying the originating location in a location history index corresponding to the current location, wherein the originating location has the one or more next locations associated with the originating location, the one or more next locations corresponding to locations where the one or more other remote computing devices were located within a time threshold after being located in the originating location;
   generating a destination recommendation list comprising the one or more next destinations ranked based at least in part on a visit frequency, the visit frequency indicating how frequently a next location was visited after visiting the originating location by the other remote computing devices;
   identifying a user profile associated with the user comprising personal preference categories;
   determining a confidence value for each next destination on the destination recommendation list by:
      comparing one or more categories associated with each respective next destination with the personal preference categories; and
      increasing the respective confidence value for the respective next destination when one of the one or more categories associated with each respective next destination matches one of the personal preference categories; and
   determining if the confidence value for each next destination exceeds a confidence threshold value, wherein the next destination is removed from destination recommendation list if the confidence value for the next destination does not exceed the confidence threshold; and
   transmitting the destination recommendation list to the remote computing device consequent to determining if the confidence value for each next destination exceeds the confidence threshold value for presentation via the remote computing device.

2. The method of claim 1, further comprising annotating, by the one or more computing devices each respective next destination in the destination recommendation list based on the preference profile associated with the user prior to transmitting the destination recommendation list.

3. The method of claim 1, further comprising annotating, by the one or more computing devices, the one or more next destinations with one or more of a distance from the current location to the next location, a route from the current location to the next location, transit options, reviews or ratings of the next location, and a promotional offer for the next location.

4. The method of claim 1, wherein only a top ranked destination recommendation from the destination recommendation list is transmitted to the remote computing device.

5. The method of claim 1, wherein next locations with a visit frequency below a frequency threshold are not included in the destination recommendation list.

6. A computer program product, comprising:
   a non-transitory computer-executable storage device having computer-executable program instructions embodied thereon that when executed by a computer cause the computer to provide destination recommendations, the computer-executable program instructions comprising:
   computer-executable program instructions to receive one or more next locations from one or more other remote computing devices for an originating location;
   computer-executable program instructions to receive a location-based signal from a remote computing device associated with a user, the location-based signal indicating a current location of the remote computing device and comprising one of a check-in signal, a post to a social network account associated with the user, and a time-stamped set of GPS coordinates;
   computer-executable program instruction to identify the originating location in a location history index corresponding to the current location, wherein the originating location has the one or more next locations associated with the originating location, the one or more next locations corresponding to locations where the one or more other remote computing devices were located-within a time threshold after being located in the originating location;

computer-executable program instructions to generate a destination recommendation list comprising the one or more next destinations;

computer-executable program instructions to identify a user profile associated with the user comprising personal preference categories;

computer-executable program instructions to determine a confidence value for each next destination on the destination recommendation list by:

comparing one or more categories associated with each respective next destination with the personal preference categories; and increasing the respective confidence value for the respective next destination when one of the one or more categories associated with each respective next destination matches one of the personal preference categories; and computer-executable program instructions to determine if the confidence value for each next destination exceeds a confidence threshold value, wherein the next destination is removed from the destination recommendation list if the confidence value for the next destination does not exceed the confidence threshold; and computer-executable program instructions to transmit the destination recommendation list to the remote computing device consequent to determining if the confidence value for each next destination exceeds the confidence threshold value.

7. The computer program product of claim 6, wherein the recommendation list comprises the one or more next destinations ranked based at least in part on a visit frequency, the visit frequency indicating how frequently a next location was visited after visiting the originating location.

8. The computer program product of claim 6, the computer-executable program instructions further comprising:

computer-executable program instructions to further increase the respective confidence value for the respective next destination based on reviews or ratings from members of a social graph of the user.

9. The computer program product of claim 6, further comprising computer-executable program instructions to annotate each respective next destination in the recommendation list based on preference profile associated with the user prior to transmitting the destination recommendation list.

10. The computer program product of claim 6, further comprising computer-executable program instructions to annotate the one or more next destinations with one or more of a distance from the current location to the next location, a route from the current location to the next location, transit options, reviews or ratings of the next location, and a promotional offer for the next location.

11. The computer program product of claim 6, wherein only a top ranked destination recommendation from the destination recommendation list is transmitted to the remote computing device.

12. The computer program product of claim 6, wherein next locations with a visit frequency below a frequency threshold are not included in the destination recommendation list.

13. A system to provide destination recommendations, comprising:

a storage device; and a processor communicatively coupled to the storage device, wherein the processor executes application code instructions that are stored in the storage device and that cause the system to:

receive one or more next locations from one or more other remote computing devices for an originating location;

receive a location-based signal from a remote computing device associated with a user, the location-based signal indicating a current location of the remote computing device and comprising one of a check-in signal, a post to a social network account associated with the user, and a time-stamped set of GPS coordinates or a combination thereof;

identify the originating location in a location history index corresponding to the current location, wherein the originating location has the one or more next locations associated with the originating location, the one or more next locations corresponding to locations where the one or more other remote computing devices were located within a time threshold after being located in the originating location;

generate a destination recommendation list comprising the one or more next destinations;

identify a user profile associated with the user comprising personal preference categories;

determine a confidence value for each next destination on the destination recommendation list by:

comparing one or more categories associated with each respective next destination with the personal preference categories; and increasing the respective confidence value for the respective next destination when one of the one or more categories associated with each respective next destination matches one of the personal preference categories; and determine if the confidence value for each next destination exceeds a confidence threshold value, wherein the next destination is removed from the destination recommendation list if the confidence value for the next destination does not exceed the confidence threshold; and transmit the destination recommendation list to the remote computing device consequent to determining if the confidence value for each next destination exceeds the confidence threshold value.

14. The system of claim 13, wherein the processor further executes application code instructions that cause the system to:

further increase the respective confidence value for the respective next destination based on reviews or ratings from members of a social graph of the user.

15. The system of claim 13, wherein the recommendation list comprises the one or more next destinations ranked based at least in part on a visit frequency, the visit frequency indicating how frequently a next location was visited after visiting the originating location.

16. The system of claim 13, wherein the processor further executes application code instructions that cause the system to annotate each respective next destination in the destination recommendation list based on the preference profile associated with the user prior to transmitting the destination recommendation list.

17. The system of claim 13, wherein the processor further executes application code instructions to annotate the one or more next destinations with one or more of a distance from the current location to the next location, a route from the current location to the next location, transit options, reviews or ratings of the next location, and a promotional offer for the next location.

18. The system of claim 13, wherein only a top ranked destination recommendation from the destination recommendation list is transmitted to the remote computing device, and is displayed on a general user interface of the remote computing device.

19. The system of claim 13, wherein next locations with a visit frequency below a frequency threshold are not included in the destination recommendation list.

* * * * *